United States Patent Office 2,917,539
Patented Dec. 15, 1959

2,917,539

PROCESS FOR THE MANUFACTURE OF CAROTENOIDS

Otto Isler, Marc Montavon, and Rudolf Ruegg, Basel, and Paul Zeller, Neuallschwil, Basel Land, Switzerland, assignors to Hoffmann-La Roche Inc., Nutley, N.J., a corporation of New Jersey No Drawing. Application December 20, 1956
Serial No. 629,457

Claims priority, application Switzerland
December 29, 1955

18 Claims. (Cl. 260—488)

The present invention relates to a new process for the manufacture of carotenoids.

The process of this invention comprises condensing by means of a metal-organic reaction 3,8-dimethyl-3,5,7-decatrien-1,9-di-yne (hereinafter called $C_{12}$-hydrocarbon) at both ends with a compound selected from the group consisting of 4-(2,6,6-trimethyl-1,3-cyclohexadien-1-yl)-, 4-(2,6,6-trimethyl-4-R-1-cyclohexen-1-yl)- and 4-(2,6,6-trimethyl-4-R-1-cyclohexylidene)-2-methyl-2-buten-1-als wherein R represents a member selected from the group consisting of hydrogen, hydroxy and acyloxy (hereinafter called, respectively, β-dehydro-$C_{14}$-aldehyde, and β-$C_{14}$-aldehyde and iso-$C_{14}$-aldehyde when R represents hydrogen), and hydrolyzing the resulting condensation product to the corresponding diol compound (hereinafter called $C_{40}$-diol), subjecting the diol compound to a treatment causing elimination of two molecules of water and allyl rearrangement, partially hydrogenating the triple bonds in the resulting carotenoid compound, and isomerizing the resulting di-cis compound to the all-trans compound.

The carotenoids obtained by the present process are useful as dyestuffs for foods, e.g. for dyeing margarine, oils, butter, fats, ice-cream powder and the like, in order to give them orange to red shades. Some of these carotenoids have also a vitamin A-like activity.

The starting compounds required for carrying out the process of this invention may be prepared, for example, in the manner described hereinafter. In this specification temperatures are given in degrees centigrade.

$C_{12}$-hydrocarbon.—3,8-dimethyl-3,5,7-decatrien-1,9-di-yne 0.1 mole of ethereal phenyl-lithium solution was added, at 0°, to a suspension of 0.1 mole of triphenyl-(3-methyl-2-penten-4-yn-1-yl)-phosphonium bromide (M.P. 152–155°; obtained by condensing triphenylphosphine with 1-bromo-3-methyl-2-penten-4-yne in glacial acetic acid) in 150 ml. of absolute ether, and the mixture was stirred under nitrogen for 3 hours. The resulting dark-red solution contained triphenyl - (3 - methyl - 2-penten-4-yn-1-ylidene)-phosphine. To this solution was added an ethereal solution of 0.1 mole of 3-methyl-2-penten-4-yn-1-al, and the reaction mixture was heated at 40° for 1 hour. The reaction mixture was then filtered, the filtrate was washed neutral with water, then dried and concentrated in vacuo. The residue was dissolved in a small quantity of ethanol or methanol, and the solution was cooled to −40° whereupon the $C_{12}$-hydrocarbon crystallized. By sublimation in a high vacuum there was obtained a product melting at 91–93° and having absorption maxima in the ultra-violet spectrum at 304, 318 and 334 m$\mu$ ($E_{1\,cm}^{1\%}$=2310, 3495 and 3240)

*Iso-$C_{14}$-aldehyde.*—*4-(2,6,6-trimethyl-1-cyclohexylidene)-2-methyl-2-buten-1-al*

The ethoxy-acetylene carbinol obtained by condensing ethoxy-acetylene with 2,6,6-trimethyl-1-cyclohexanone was partially hydrogenated at the triple bond in a manner known per se, the resulting ethoxy-ethylene carbinol was hydrolysed with acid, the resulting (2,6,6-trimethyl-1-cyclohexylidene)acetaldehyde was acetalised, the acetal was condensed in the presence of an acidic condensing agent with a propenyl ether, and the resulting condensation product was treated with acid. The resulting aldehyde shows an U.V. absorption maximum at 288 m$\mu$ (in petroleum ether); the phenylsemicarbazone melts at 158–159°.

*4 - acetoxy - iso-$C_{14}$-aldehyde.*—*4-(2,6,6-trimethyl-4-acetoxy-1-cyclohexylidene)-2-methyl-2-buten-1-al*

138 g. of 2,6,6-trimethyl-1-cyclohexen-4-one [which can be made, for example, from isophorone by known procedures; compare Kharasch, Journal of the American Chemical Society, 63, 2308 (1941)] in 50 ml. of glacial acetic acid were stirred for two hours at 0–10° with 160 ml. of peracetic acid (containing 530 mg. of peracetic acid per ml.) and the mixture was allowed to stand overnight 20°. Then, while adding ice, the reaction mixture was made weakly alkaline (pH about 8) by adding 30% aqueous NaOH solution, and the reaction mixture was shaken for one hour at 20°. Then the mixture was extracted twice, each time with 800 ml. of diethyl ether, and the ether solutions were washed once with 200 ml. of saturated ammonium chloride solution. The ether solutions were combined and dried over sodium sulfate, the solvent was driven off, and the residue was distilled in a high vacuum. A forerun passed over between 70 and 80°, and then 2,6,6-trimethyl-2-cyclo-hexen-1-ol-4-one was obtained as an almost colorless oil having B.P. 110–112°/0.1 mm. Hg, $n_D^{20}$=1.501, U.V. absorption maximum at 226 m$\mu$ ($E_1^1$=1110 in petroleum ether solution), after standing for some time. The phenylsemicarbazone had M.P. 189–190°, U.V. absorption maxima at 240.5 m$\mu$ and 285 m$\mu$ ($E_1^1$=807 and 778 in ethanol).

To 154 g. of 2,6,6-trimethyl-2-cyclohexen-1-ol-4-one in 200 ml. of glacial acetic acid and 500 ml. of water were quickly added dropwise 70 g. of chromic anhydride in 200 ml. of water, while stirring and cooling, so that the temperature did not rise above 30°. The mixture was then stirred overnight at 20°. Then the reaction mixture was saturated with ammonium chloride and was extracted with 1000 ml. of petroleum ether (boiling range 30–60°). The aqueous layer was again extracted in a second separatory funnel with 500 ml. of petroleum ether. The petroleum ether solutions were washed with saturated ammonium chloride solution to which a little ammonia had been added, and then with pure saturated ammonium chloride solution. The washed extracts were dried over sodium sulfate and the solvent was driven off. The product, 2,6,6-trimethyl-2-cyclohexene-1,4-dione, was distilled under a water pump vacuum; B.P. 92–94°/11 mm. Hg yellow oil which solidified to crystalline form in the refrigerator, $n_D^{21}$=1.490, U.V. absorption maximum at 238 m$\mu$ ($E_1^1$=942 in petroleum ether). The phenylsemicarbazone had M.P. 190°, then resolidified and melted again at 230°, U.V. absorption maxima at 242.5 m$\mu$ and 325.5 m$\mu$ ($E_1^1$=875 and 580 in ethanol).

65 g. of 2,6,6-trimethyl-2-cyclohexene-1,4-dione in 250 ml. of glacial acetic acid were slowly reacted with 130 g. of zinc dust, while stirring, so that the temperature did not rise above 50°. Then the reaction mixture was stirred for an additional period of one hour. The reaction mixture was filtered, diluted with 1000 ml. of water and then saturated with ammonium chloride. The mixture was extracted twice, each time with 800 ml. of petroleum ether (boiling range 30–60°). The petroleum ether solutions were washed with 300 ml. of saturated ammonium chloride solution to which some ammonia was added, and then were washed with pure saturated ammonium chloride solution. (In case a portion of the product crystallizes from the petroleum ether solution, it is filtered off, the crystalline material is dissolved in diethyl ether, then the diethyl ether solution is washed as indicated above, dried over sodium sulfate and then combined with the petroleum ether solution.) The solvent was driven off until the product 2,6,6-trimethyl-1,4-cyclohexanedione started to crystallize out; colorless needles, M.P. 63–65°, having no absorption maximum in the ultraviolet spectrum between 220 and 280 m$\mu$. The phenyl-semicarbazone had M.P. 218–220°, U.V. absorption maximum at 250 m$\mu$ ($E_1^1$=1030 in ethanol).

34.6 g. of 2,6,6-trimethyl-1,4-cyclohexandione, 100 ml. of benzene, 19 g. of ethylene glycol and 0.2 g. of p-toluene-sulfonic acid were refluxed for seven hours while separating the water which was formed. After cooling, the reaction mixture was poured into 300 ml. of 5% sodium bicarbonate solution, and the 2,6,6-trimethyl-4-ethylenedioxy-1-cyclohexanone product was obtained by extraction with diethyl ether and distillation of the extract. The product was obtained as a colorless oil, having B.P. 70°/0.02 mm. Hg, $n_D^{21}$=1.469.

To a lithium amide suspension prepared by dissolving 6.7 g. of lithium in 2000 ml. of liquid ammonia were added slowly, while stirring, 52 g. of 1-methoxy-2-methyl-3-butyn-2-ol. The mixture was stirred for one hour and then 79 g. of 2,6,6-trimethyl-4-ethylenedioxy-1-cyclohexanone were added, and the reaction mixture was stirred overnight at the boiling temperature of the ammonia. 60 g. of ammonium chloride were added and then the ammonia was driven off. The residue was taken up in diethyl ether, and insoluble material was filtered off; the ether solution was washed with a saturated solution of ammonium chloride, then was dried over sodium sulfate, and the ether was driven off. The residue was suspended in 450 ml. of petroleum ether and was extracted four times, each time with 300 ml. of 70% methanol. The methanol extracts were washed three times, each time with 150 ml. of petroleum ether, then were diluted with saturated ammonium chloride solution and the precipitated material was taken up in diethyl ether. The ether solution was washed with water, dried over sodium sulfate, and the ether was driven off. There were thus obtained 92 g. of 4-(2,6,6-trimethyl-4-ethylenedioxy-1-hydroxy-1-cyclohexyl)-2-methyl-1-methoxy-3-butyn-2-ol as a yellow viscous oil.

92 g. of the latter were dissolved in 3000 ml. of dry diethyl ether, were mixed while stirring at 0–5° with a solution of 22.5 g. of lithium aluminum hydride in 300 ml. of dry diethyl ether, and the reaction mixture was refluxed for four hours. Then the reaction mixture was cooled with ice, 250 ml. of methanol were added slowly while stirring at 0–5°, and the clear solution was poured into a mixture of 100 g. of ice and 600 ml. of saturated ammonium chloride solution. The precipitated aluminum hydroxide was filtered off, the precipitate was washed with diethyl ether, and the washings were added to the filtrate. The combined liquors were washed with water, dried over sodium sulfate and the solvents were driven off. The residue was partitioned between petroleum ether and 70% methanol, in the manner indicated above, and from the methanol extracts there were obtained 70 g. of 4-(2,6,6-trimethyl-4-ethylenedioxy-1-hydroxyl-1-cyclohexyl)-2-methyl-1-methoxy-3-buten-2-ol as a light-yellow, viscous oil.

70 g. of the latter were mixed with 140 ml. of formic acid and the mixture was heated for 25 minutes at 100°. The reaction mixture was poured onto ice and extracted with di-ethyl ether, the ethereal solution was washed with water and with dilute sodium bicarbonate solution, dried over sodium sulfate, and the ether was driven off. The residue was dissolved in 200 ml. of glacial acetic acid, 26 ml. of water and 32 g. of sodium acetate were added, and the mixture was heated at 95° for two hours. Then it was diluted with ice water, and was extracted with diethyl ether, the ether extract was washed with water and with dilute sodium bicarbonate solution, dried over sodium sulfate and the ether was driven off. The residue was distilled in vacuum, thereby yielding 4-(2,6,6-trimethyl-4-oxo-1-cyclohexylidene)-2-methyl-2-buten-1-al as a yellow oil having B.P. ca. 110°/0.02 mm. Hg, $n_D^{21}$=1.555 (U.V. absorption maximum at 284 m$\mu$ in petroleum ether).

A solution of 31 g. of 4-(2,6,6-trimethyl-4-oxo-1-cyclohexylidene)-2-methyl-2-buten-1-al in 34 ml. of orthoformic acid ethyl ester and 7 ml. of absolute ethanol was mixed with 0.65 ml. of orthophosphoric acid and 0.05 g. of p-toluenesulfonic acid, and the mixture was allowed to stand for 24 hours at room temperature. 7 ml. of pyridine were added and then the mixture was poured upon ice and dilute sodium bicarbonate solution, the resulting mixture was extracted with petroleum ether, the petroleum ether extract was washed with water, dried over sodium sulfate, the solvent was driven off and the residue was dried in vacuo at 60°. There were thus obtained 40 g. of 4-(2,6,6-trimethyl-4-oxo-1-cyclohexylidene)-2-methyl-1,1-diethoxy-2-butene (U.V. absorption maximum at 248 m$\mu$ in petroleum ether).

40 g. of the latter product were dissolved in 600 ml. of dry diethyl ether and were mixed slowly, while stirring at 0–5°, with a solution of 2.8 g. of lithium aluminum hydride in 40 ml. of diethyl ether. The reaction mixture was stirred for one hour at room temperature, then was cooled to 0–5°; 20 ml. of methanol were added slowly, and the reaction mixture was poured upon ice and saturated ammonium chloride solution. The precipitated aluminum hydroxide was filtered off and washed with diethyl ether, the ether was added to the filtrate, the combined liquors were dried over sodium sulfate and the solvent material was driven off. There was obtained 39.5 g. of 4-(2,6,6-trimethyl-4-hydroxyl-1-cyclohexylidene)-2-methyl-1,1-diethoxy-2-butene.

39.5 g. of the latter were acetylated by mixing it with 40 ml. of pyridine and 20 ml. of acetic anhydride and permitting the mixture to stand for 20 hours. The reaction mixture was poured into ice water, extracted with petroleum ether, the organic layer was washed with cold sodium bicarbonate solution, dried over sodium sulfate and the solvent was driven off, yielding 42 g. of 4-(2,6,6-trimethyl-4-(acetoxy-1-cyclohexylidene)-2-methyl-1,1-diethoxy-2-butene.

42 g. of the latter were mixed with 400 ml. of glacial acetic acid, 50 ml. of water and 65 g. of sodium acetate and heated at 95° for three hours. Then the reaction mixture was diluted with ice water and was extracted with diethyl ether. The ethereal solution was washed several times with water, dried over sodium sulfate and the ether was driven off. There were thus obtained 31 g. of 4-(2,6,6-trimethyl-4-acetoxy-1-cyclohexylidene)-2-methyl-2-buten-1-al (U.V. absorption maximum at 284 m$\mu$ in petroleum ether).

*4-acetoxy-β-$C_{14}$-aldehyde.—4-(2,6,6-trimethyl-4 - acetoxy-1-cyclohexen-1-yl)-2-methyl-2-buten-1-al*

31 g. of 4-(2,6,6-trimethyl-4-acetoxy-1-cyclohexylidene)-2-methyl-2-buten-1-al were dissolved in 40 ml. of toluene, mixed with 16 g. of isopropenyl acetate and 0.2 g. of p-toluenesulfonic acid and the mixture was heated at 120–140° while continuously removing the acetone which was formed. After approximately two hours, the reaction mixture was cooled down, poured into ice water and extracted with petroleum ether. The petroleum ether solution was washed with cold sodium bicarbonate solution and then with water, dried over sodium sulfate and the solvent was distilled off. There were thus obtained 34 g. of 4-(2,6,6-trimethyl-4-acetoxy-1-cyclohexen-1-yl)-2-methyl-1-acetoxy-1,3-butadiene (U.V. absorption maximum at 262 m$\mu$ in petroleum ether).

34 g. of the latter were dissolved in 750 ml. of methanol, mixed with 75 ml. of water and 27 g. of sodium bicarbonate and the mixture was refluxed for six hours while stirring. Then the reaction mixture was diluted with ice water, extracted with diethyl ether, the ether solution was washed with water, dried over sodium sulfate and the ether was driven off. In order to achieve acetylation of the hydroxy group, attached to the ring, the residue, presumably containing at least some 4-(2,6,6-trimethyl-4-hydroxy-1-cyclohexen-1-yl)-2-methyl-2-buten-1-al, was mixed with 60 ml. of pyridine and 30 ml. of acetic anhydride and the mixture was allowed to stand for 20 hours at room temperature. 100 ml. of ice water were added and the mixture was then extracted with diethyl ether. The ethereal solution was washed with cold sodium bicarbonate solution and then with water, dried over sodium sulfate and the solvent was driven off. The 4-(2,6,6-trimethyl-4-acetoxy-1-cyclohexen-1-yl)-2-methyl-2-buten-1-al thus obtained is a yellowish oil and shows U.V. absorption maximum at 234 m$\mu$ (petroleum ether). Its phenylsemicarbazone melts at 190–192°; U.V. absorption maxima at 238 and 276 m$\mu$ (petroleum ether).

*Dehydro-β-$C_{14}$-aldehyde.* — 4-(2,6,6-trimethyl-1,3-cyclohexadien-1-yl)-2-methyl-2-buten-1-al 136 parts by weight of 4-(2,6,6-trimethyl-2-cyclohexen-1-ylidene)-2-methyl-2-buten-1-al together with 97 parts by volume of isopropenyl acetate and 0.7 part by weight of p-toluene-sulphonic acid were heated at 100–140° for 3–4 hours, while passing a slow current of nitrogen through the mixture, the acetone formed during the reaction being continuously removed from the reaction mixture by distillation. After cooling, the thus obtained crude 4-(2,6,6-trimethyl-1,3-cyclohexadien-1-yl)-2-methyl-1-acetoxy-1,3-butadiene was directly hydrolysed. For this purpose, 650 parts by volume of methyl alcohol, 65 parts by volume of water and 46 parts by weight of sodium bicarbonate were added, and the mixture was refluxed for 5–6 hours, while stirring. The reaction mixture was then poured into 2000 parts by volume of ice water and weakly acidified with dilute sulphuric acid. The reaction product was taken up in ether, and the ethereal solution was washed with sodium bicarbonate solution and dried over sodium sulphate. After removal of the solvent by distillation, the residue was distilled in a high vacuum. There were thus obtained 98 parts by weight of 4-(2,6,6-trimethyl-1,3-cyclohexadien-1-yl)-2-methyl-2-buten-1-al; B.P.80°/0.05 mm. Hg; $n_D^{22}$=1.530; U.V. absorption maxima at 224 and 268 m$\mu$.

$$E_{1\ cm.}^{1\%} = 795 \text{ and } 345$$

respectively (in petroleum ether). Phenylsemicarbazone: melting point 184–185°.

In the first step of the process according to this invention a metal-organic derivative of the $C_{12}$-hydrocarbon is reacted with β-dehydro-$C_{14}$-aldehyde, or with a β-$C_{14}$- or iso-$C_{14}$-aldehyde in which the oxygen of an oxygen-containing group which does not take place in the reaction may be attached to the 4-position of the nucleus. Metal-organic compounds which are particularly suitable for this reaction include the alkali metal derivatives and the magnesium-organic derivatives of the $C_{12}$-hydrocarbon. These metal-organic derivatives can be obtained in a known manner by reacting the $C_{12}$-hydrocarbon with the corresponding metals or derivatives thereof, such as sodium and lithium amide, alkyl- or aryl-lithium compounds, and alkyl- or aryl-magnesium halides, e.g. phenyl-lithium, phenyl-magnesium bromide and ethyl-magnesium bromide. The reaction is best carried out in an inert solvent, such as ether, benzene and the like, or in liquid ammonia. It is advantageous to use the same reaction medium and the same reaction vessel as used for the preparation of the metal-organic derivative. The condensation takes place already at room temperature and can be accelerated and completed by heating. In order to avoid secondary reactions, it is advantageous to effect the condensation in an inert atmosphere, e.g. under nitrogen. After completion of the reaction, the resulting metal-organic reaction product is hydrolyzed in a known manner, e.g. by means of water, ammonium acetate solution, etc. The obtained $C_{40}$-diol need not be purified before being further reacted. It may be identified by the Zerewitinoff test and the U.V. absorption spectrum. This diol consists of a mixture of stereoisomeric forms.

In the second step of the present invention the $C_{40}$-diol is subjected, if desired after esterification, to a treatment causing splitting off of two molecules of water or acid and allyl rearrangement. Rearrangement and splitting off of water or acid may also be brought about by the action of aqueous or anhydrous hydrohalic acid. Conveniently, the $C_{40}$-diol is esterified, e.g. acetylated, prior to the cleavage and rearrangement. A suitable mode of carrying out this step consists in treating a solution of the $C_{40}$-diol or of an ester thereof in an inert solvent, such as ether, methylene chloride, dioxane and the like, with anhydrous hydrohalic acid. Only a small quantity of acid need be used if the reaction is accelerated by heating. It is advantageous to effect the reaction in ethyl ether and to use an excess of alcoholic hydrochloric acid. According to another mode of executing this step, the $C_{40}$-diol or an ester thereof is treated in a halogenated hydrocarbon having a high dipole moment with aqueous hydrohalic acid at a temperature below 0°, and subsequently hydrogen halide is split off from the resulting halogenated compound by means of water or a basic compound. Solvents which may be used for this purpose include methylene chloride and chloroform, and concentrated aqueous hydrobromic acid may be used as the aqueous hydrohalic acid. The elimination of water or acid may also be performed by means of phosphorus oxychloride in pyridine. There are thus obtained carotenoids which still contain triple bonds in the positions 11,12 and 11',12' instead of double bonds and which have a characteristic U.V. absorption spectrum.

The third step of the process of this invention consists in partially hydrogenating the triple bonds. This hydrogenation may be carried out in suspension. e.g. in petroleum ether, toluene and the like, preferably by means of a deactivated palladium catalyst and in the presence of quinoline. The carotenoids obtained by partial hydrogenation have the cis-configuration at the resulting double bonds and possess an U.V. absorption spectrum which is typical of this type of compounds.

In the fourth step of the present process the cis-carotenoids are isomerized to the corresponding all-trans compounds. The isomerization is carried out in a known manner, for example by the action of iodine or light in solution, but preferably by heating in petroleum ether.

The present invention will now be illustrated by the following examples, however without being limited thereto.

EXAMPLE 1

β-Carotene 3.6 g. (0.023 mole) of 3,8-dimethyl-3,5,7-decatrien-1,9-di-yne were dissolved in 50 ml. of absolute ether, and to the solution was added 0.05 mole of ethereal phenyl-lithium solution. The mixture was refluxed for 30 minutes. Then a solution of 11 g. (0.05 mole) of 4-(2,6,6-trimethyl-1-cyclohexen-1-yl)-2-methyl-2-buten-1-al in 100 ml. of ether were added dropwise, and the reaction mixture was boiled for 2 hours. The reaction mixture was then hydrolyzed with aqueous ammonium acetate solution, and the ethereal layer was separated, dried and concentrated. The residue, i.e. 1,18-di(2,6,6-trimethyl-1-cyclohexen-1-yl) - 3,7,12,16 - tetramethyl-4,15-dihydroxy-2,7,9,11,16 - octadecapentaen - 5, 13-di-yne, was a resinous product (having 1.9 active hydrogen atoms and absorption maxima in the ultra-violet spectrum at 326 and 341 mμ) which was used for the next step without any further purification. The resin was dissolved in 200 ml. of methylene chloride, 10 ml. of glacial acetic acid were added to the solution, and the mixture was cooled to −40° in a carbon dioxide atmosphere, while stirring. Then, 9 ml. of aqueous hydrobromic acid (60%) were added in one portion, the mixture was stirred at −35° for 1½ minutes, and subsequently 200 ml. of ice water were run into the mixture. After further stirring the mixture for 2 hours at 0°, the methylene chloride layer was separated, washed with water and sodium bicarbonate solution, dried with $Na_2SO_4$ and concentrated in vacuo. The residue, i.e. 11,12-11′,12′-bis-dehydro-β-carotene, was a tough resin or a foamy solid (having no active hydrogen atoms and possessing absorption maxima in the ultra-violet spectrum at 334 and 408 mμ). This product can be purified by chromatography. The crude product can also be used for the next step without any preliminary purification.

11.4 g. of 11,12-11′,12′-bis-dehydro-β-carotene were dissolved in 100 ml. of petroleum ether (boiling range 80–100°), and the solution was hydrogenated under normal conditions after the addition of 0.5 ml. of quinoline and 5 g. of a lead-poisoned palladium catalyst. After the calculated amount of hydrogen had been absorbed, the catalyst was removed by filtration and the filtrate was extracted with dilute sulfuric acid to remove the quinoline. By concentrating the solution in the usual manner there was obtained 11,12-11′,12′-di-cis-carotene. The product was purified by recrystallisation from benzene-alcohol. The purified product melts at 154°; absorption maxima in the ultra-violet spectrum at 276, 334, 338, 401 and 405 mμ. The isomerisation was effected by heating the product for 10 hours at 90–100° in high-boiling petroleum ether in a carbon dioxide atmosphere. The resulting β-carotene melted at 180°; U.V. absorption maxima at 452 and 480 mμ.

EXAMPLE 2

*Bis-dehydro-β-carotene*

1.4 g. of 3,8-dimethyl-3,5,7-decatrien-1,9-di-yne were dissolved in 100 ml. of absolute ether, and to the solution were added 20 ml. of N ethereal phenyl-lithium solution. After refluxing the mixture for 30 minutes a solution of 3.5 g. of 4-(2,6,6-trimethyl-1,3-cyclohexadien-1-yl)-2-methyl-2-buten-1-al in 100 ml. of absolute ether was added, and the reaction mixture was then boiled for one hour. After hydrolysing the reaction mixture with ammonium chloride solution, separating the ethereal layer, drying and concentrating, there was obtained 1,18-di(2,6,6-trimethyl-1,3-cyclohexadien - 1 - yl) - 3,7,12,16-tetramethyl-4,15-dihydroxy-2,7,9,11,16-octadecapentaen-5, 13-di-yne in the form of a tough resin; absorption maxima in the ultra-violet spectrum at 266, 330 and 346 mμ. The crude product was dehydrated in the manner described in Example 1 to obtain 3,4-3′,4′-11,12-11′,12′-tetradehydro-β-carotene; U.V. absorption maxima at 335, 382 and 403 mμ. By partially hydrogenating and isomerizing this compound in the manner described in Example 1 there was obtained 3,4-3′,4′-bis-dehydro-β-carotene of M.P. 190–191°; ultra-violet spectrum with a broad absorption maximum at 471 mμ.

EXAMPLE 3

*Zeaxanthene*

0.8 g. of 3,8-dimethyl-3,5,7-decatrien-1,9-di-yne were dissolved in 50 ml. of absolute ether, and to the resulting solution there were added dropwise 10 ml. of N ethereal phenyl-lithium solution. After boiling for one hour, a solution of 2.5 g. of 4-(2,6,6-trimethyl-4-acetoxy-cyclohexylidene)-2-methyl-2-buten-1-al in 50 ml. of absolute ether was added to the light-yellow suspension whereupon a thick white precipitate formed. After refluxing for one hour, the reaction mixture was hydrolyzed by means of ammonium acetate solution. The ethereal layer was separated, washed with water, dried over sodium sulfate and concentrated in vacuo. There remained a foamy solid consisting of 1,18-di-(2,6,6-trimethyl-4-acetoxy - cyclohexylidene) - 3,7,12,16 - tetramethyl - 4,15-dihydroxy - 2,7,9,11,16 - octadecapentaen - 5,13, - di-yne; yield: 3–4 g. This product was used for the next step without any preliminary purification. It was dissolved in 80 ml. of benzene, and 2 ml. of pyridine were added to the resulting solution. To the solution was added in a nitrogen atmosphere, while stirring, a mxiture of 0.7 ml. of phosphorus oxychloride, 0.7 ml. of pyridine and 20 ml. of benzene. The reaction mixture was heated for 1 hour at 70–80° and then poured into ice water. The separated benzene layer was washed neutral, dried and concentrated. The residue, i.e. 3,3′-di-acetoxy-11,12-11′,12′-bis-dehydro-β-carotene, which consisted of a tough resin, was purified by chromatography on alumina by means of petroleum ether-benzene, and the purified product was saponified by heating in a nitrogen atmosphere with 10% methanolic potassium hydroxide solution in ethereal solution. The resulting 3,3′-dihydroxy-11,12-11′,12′-bis-dehydro-β-carotene showed absorption maxima in the ultra-violet spectrum at 334 and 408 mμ. The partial hydrogenation and the isomerization were carried out in the manner described in Example 1. In the ultra-violet spectrum, the thus obtained synthetic zeaxanthene showed the same absorption maxima at 452 and 480 mμ as β-carotene.

We claim:

1. A process which comprises condensing 3,8-dimethyl-3,5,7-decatrien-1,9-di-yne bilaterally with a compound selected from the group consisting of 4-(2,6,6-trimethyl)-1,3-cyclohexadien-1-yl)-2-methyl-2-buten-1-al, 4-(2,6,6-trimethyl - 4 - R - 1 - cyclohexen - 1 - yl) - 2 - methyl - 2-buten-1-al and 4-(2,6,6-trimethyl-4-R-1-cyclohexylidene)-2-methyl-2-buten-1-al, wherein R represents a member selected from the group consisting of hydrogen, hydroxy and lower alkanoyloxy, in an inert solvent by means of a metal organic reaction, hydrolyzing the reaction product in aqueous solution to obtain, respectively, a diol of the group consisting of 1,18-di-(2,6,6-trimethyl-1,3-cyclohexadien - 1 - yl) - 3,7,12,16 - tetramethyl - 4,15 - dihydroxy-2,7,9,11,16-octadecapentaen-5,13-di-yne, 1,18-di-(2,6,6 - trimethyl - 4 - R - 1 - cyclohexen - 1 - yl) - 3,7,-12,16 - tetramethyl - 4,15 - dihydroxy - 2,7,9,11,16 - octadecapentaen - 5,13 - di - yne and 1,18 - di - (2,6,6 - trimethyl - 4 - R - 1 - cyclohexylidene) - 3,7,12,16 - tetramethyl - 4,15 - dihydroxy - 2,7,9,11,16 - octadecapentaen-5,13-di-yne, wherein R has the same significance as above, treating said diol with acid whereupon two molecules of water are eliminated and allyl rearrangement simultaneously occurs, thereby producing respectively, a carotenoid selected from the group consisting of 1,18-di-(2,6,6-trimethyl-1,3-cyclohexadien-1-yl) - 3,7,12,16-tetramethyl - 1,3,7,9,11,15,17 - octadecaheptaen - 5,13 - di-yne, 1,18-di-(2,6,6-trimethyl-4-R-1-cyclohexen-1-yl)-3,7,-12,16 - tetramethyl - 1,3,7,9,11,15,17 - octadecaheptaen-5,13-di-yne and 1,18-di-(2,6,6-trimethyl-4-R-1-cyclohexylidene) - 3,7,12,16 - tetramethyl - 1,3,7,9,11,15,17 - octadecaheptaen-5,13-di-yne, wherein R has the same significance as above, and selectively catalytically hydrogenating the triple bonds in said last named carotenoids to double bonds.

2. A process as in claim 1 wherein 3,8-dimethyl-3,5,7-decatrien-1,9-di-yne di-lithium derivative is used in said initial condensation.

3. A process as in claim 1 wherein 3,8-dimethyl-3,5,7-decatrien-1,9-di-yne di-sodium derivative is used in said initial condensation.

4. A process as in claim 1 wherein 3,8-dimethyl-3,5,7-decatrien-1,9-di-yne di-alkylmagnesium derivative is used in said initial condensation.

5. A process as in claim 1 wherein the end products are heated thereby isomerizing di-cis carotenoid to all-trans carotenoid.

6. A process which comprises condensing 3,8-dimethyl-3,5,7-decatrien-1,9-di-yne bilaterally with a compound selected from the group consisting of 4-(2,6,6-trimethyl-1,3 - cyclohexadien - 1 - yl) - 2 - methyl - 2 - buten-1-al, 4-(2,6,6-trimethyl-4-R-1-cyclohexen-1-yl)-2-methyl-2 - buten - 1 - al and 4 - (2,6,6 - trimethyl - 4 - R - 1-cyclohexylidene) 2-methyl-2-buten-1-al, wherein R represents a member selected from the group consisting of hydrogen, hydroxy and lower alkanoyloxy, in an inert solvent by means of a metal organic reaction, hydrolyzing the reaction product in aqueous solution to obtain, respectively, a dihydroxy diol of the group consisting of 1,18-di-(2,6,6-trimethyl - 1,3 - cyclohexadien - 1 - yl) - 3,7,12,16 - tetramethyl - 4,15 - dihydroxy - 2,7,9,11,16 - octadecapentaen-5,13 - di - yne, 1,18 - di - (2,6,6 - trimethyl - 4 - R - 1-cyclohexen - 1 - yl) - 3,7,12,16 - tetramethyl - 4,15 - dihydroxy - 2,7,9,11,16 - octadecapentaen - 5,13 - di - yne and 1,18 - di - (2,6,6 - trimethyl - 4 - R - 1 - cyclohexylidene) - 3,7,12,16 - tetramethyl - 4,15 - dihydroxy-2,7,9,11,16 - octadecapentaen - 5,13 - di - yne, wherein R has the same significance as above, esterifying the two central hydroxy groups of said diol with a lower fatty acid, treating the resulting ester with acid whereupon two molecules of acid are eliminated and allyl rearrangement simultaneously occurs, thereby producing, respectively, a carotenoid selected from the group consisting of 1,18 - di - (2,6,6 - trimethyl - 1,3 - cyclohexadien-1 - yl) - 3,7,12,16 - tetramethyl - 1,3,7,9,11,15,17 - octadecaheptaen - 5,13 - di - yne, 1,18 - di - (2,6,6 - trimethyl - 4 - R - 1 - cyclohexen - 1 - yl) - 3,7,12,16-tetramethyl - 1,3,7,9,11,15,17 - octadecaheptaen - 5,13-di - yne and 1,18 - di - (2,6,6 - trimethyl - 4 - R - 1-cyclohexylidene) - 3,7,12,16 - tetramethyl - 1,3,7,9,11,15,17 - octadecaheptaen - 5,13 - di - yne, wherein R has the same significance as above, and selectively catalytically hydrogenating the triple bonds in said last named carotenoids to double bonds.

7. A process which comprises condensing a metal organic derivative of 3,8-dimethyl-3,5,7-decatrien-1,9-di-yne in an inert solvent bilaterally with a compound selected from the group consisting of 4-(2,6,6-trimethyl-1,3-cyclohexadien - 1 - yl) - 2 - methyl - 2 - buten - 1 - al, 4 - (2, 6,6 - trimethyl - 4 - R - 1 - cyclohexen - 1 - yl) - 2-methyl - 2 - buten - 1 - al and 4 - (2,6,6 - trimethyl - 4-R - 1 - cyclohexylidene) - 2 - methyl - 2 - buten - 1 - al, wherein R represents a member selected from the group consisting of hydrogen, hydroxy and lower alkanoyloxy, and hydrolyzing the reaction product in aqueous solution to obtain, respectively, a diol of the group consisting of 1,18 - di - (2,6,6 - trimethyl - 1,3 - cyclohexadien - 1 - yl)-3,7,12,16 - tetramethyl - 4,15 - dihydroxy - 2,7,9,11,16-octadecapentaen - 5,13 - di - yne, 1,18 - di - (2,6,6 - trimethyl - 4 - R - 1 - cyclohexen - 1 - yl) - 3,7,12,16 - tetramethyl - 4,15 - dihydroxy - 2,7,9,11,16 - octadecapentaen-5,13 - di - yne and 1,18 - di - (2,6,6 - trimethyl - 4 - R-1 - cyclohexylidene) - 3,7,12,16 - tetramethyl - 4,15 - dihydroxy - 2,7,9,11,16 - octadecapentaen - 5,13 - di - yne, wherein R has the same significance as above.

8. A process which comprises condensing 3,8-dimethyl-3,5,7 - decatrien - 1,9 - di - yne bilaterally with 4 - (2, 6,6 - trimethyl - 1 - cyclohexen - 1 - yl) - 2 - methyl - 2-buten - 1 - al in an inert solvent by means of a metal organic reaction, hydrolyzing the reaction product in aqueous solution to obtain 1,18-di-(2,6,6-trimethyl-1-cyclohexen - 1 - yl) - 3,7,12,16 - tetramethyl - 4,15 - dihydroxy - 2,7,9,11,16 - octadecapentaen - 5,13 - di - yne, treating the last named compound with acid whereupon two molecules of water are eliminated and allyl rearrangement simultaneously occurs, thereby producing 1,18-di - (2,6,6 - trimethyl - 1 - cyclohexen - 1 - yl) - 3,7,12, 16 - tetramethyl - 1,3,7,9,11,15,17 - octadecaheptaen - 5, 13-di-yne, selectively catalytically hydrogenating the triple bonds in the last named compound to double bonds to obtain di-cis-β-carotene and heating the di-cis-β-carotene to obtain all-trans-β-carotene.

9. 1,18 - di - (2,6,6 - trimethyl - 1,3 - cyclohexadien-1 - yl) - 3,7,12,16 - tetramethyl - 4,15 - dihydroxy - 2,7, 9,11,16 - octadecapentaen - 5,13 - di - yne.

10. 1,18 - di - (2,6,6 - trimethyl - 4 - hydroxy - 1 - cyclohexen - 1 - yl) - 3,7,12,16 - tetramethyl - 4,15 - dihydroxy - 2,7,9,11,16 - octadecapentaen - 5,13 - di - yne.

11. 1,18 - di - (2,6,6 - trimethyl - 4 - hydroxy - 1 - cyclohexylidene) - 3,7,12,16 - tetramethyl - 4,15 - dihydroxy-2,7,9,11,16-octadecapentaen-5,13-di-yne.

12. 1,18 - di - (2,6,6 - trimethyl - 4 - lower alkanoyloxy - 1 - cyclohexen - 1 - yl) - 3,7,12,16 - tetramethyl-4,15-dihydroxy-2,7,9,11,16-octadecapentaen-5,13-di-yne.

13. 1,18-di-(2,6,6-trimethyl-4-lower alkanoyloxy-1-cyclohexylidene) - 3,7,12,16 - tetramethyl - 4,15 - dihydroxy-2,7,9,11,16-octadecapentaen-5,13-di-yne.

14. 1,18 - di - (2,6,6 - trimethyl - 1,3 - cyclohexadien-1 - yl) - 3,7,12,16 - tetramethyl - 1,3,7,9,11,15,17 - octadecaheptaen-5,13-di-yne.

15. 1,18 - di - (2,6,6 - trimethyl - 4 - hydroxy - 1 - cyclohexen - 1 - yl) - 3,7,12,16 - tetramethyl - 1,3,7,9,11,15, 17-octadecaheptaen-5,13-di-yne.

16. 1,18-di-(2,6,6-trimethyl-4-lower alkanoyloxy-1-cyclohexen - 1 - yl) - 3,7,12,16 - tetramethyl - 1,3,7,9,11,15, 17-octadecaheptaen-5,13-di-yne.

17. 3,8-dimethyl-3,5,7-decatrien-1,9-di-yne.

18. 11,12-11',12'-di-cis-zeaxanthene.

References Cited in the file of this patent

UNITED STATES PATENTS 2,609,396   Inhoffen et al. _____ Sept. 2, 1952

OTHER REFERENCES

Inhoffen et al.: Annalen der Chemie, vol. 573, pgs. 1–16 (1951).

Inhoffen et al.: Annalen der Chemie, vol. 578, pgs. 177–187 (1952).

Zechmeister et al.: Jour. Amer. Chem. Soc., vol. 75 (1953), pg. 4493.

Zechmeister et al.: Jour. Amer. Chem. Soc., vol. 75 (1953), pg. 5341.

Inhoffen et al.: Annalen der Chemie, vol. 585, pgs. 126–131 (1954).